United States Patent [19]

Fannon

[11] Patent Number: 4,989,822

[45] Date of Patent: Feb. 5, 1991

[54] ROD GUIDE CLIP

[75] Inventor: Joseph P. Fannon, Washington, Mich.

[73] Assignee: General Motors Corporation, Detroit, Mich.

[21] Appl. No.: 534,605

[22] Filed: Jun. 7, 1990

[51] Int. Cl.[5] .......... F16L 3/02; F16L 3/18; F16L 3/20

[52] U.S. Cl. .......... 248/632; 248/60; 248/71; 248/74.2

[58] Field of Search .......... 248/221.4, 50, 74.3, 248/60, 71, 74.2, 617, 73, 160, 632, 618, 104; 403/389, 392; 292/216

[56] References Cited

U.S. PATENT DOCUMENTS

| | | | |
|---|---|---|---|
| 601,732 | 4/1898 | McCollom | 248/104 |
| 895,042 | 8/1908 | Rogers | 248/617 X |
| 1,385,463 | 7/1921 | Masury et al. | 248/632 X |
| 2,444,585 | 7/1948 | Tubiolo | 248/104 |
| 3,261,579 | 7/1966 | Engman et al. | 248/60 |
| 3,317,167 | 5/1967 | Becker et al. | 248/73 |
| 4,042,198 | 8/1977 | Takeuchi | 248/74.2 X |
| 4,318,518 | 3/1982 | Davis | 248/60 |
| 4,840,334 | 6/1989 | Kikuchi | 248/74.2 |
| 4,856,739 | 8/1989 | Takikawa | 248/74.2 |
| 4,865,281 | 9/1989 | Wollar | 248/71 |

*Primary Examiner*—Carl D. Friedman
*Assistant Examiner*—Derek Berger
*Attorney, Agent, or Firm*—Herbert Furman

[57] ABSTRACT

A rod guide member includes a strap portion of flexible material having an integral attachment at one end thereof to attach the strap portion to a support and an integral rod attachment at the other end thereof to attach the strap portion to a rod spaced from the support. The strap portion is return bent upon itself between its end portions to accommodate both linear and shifting movement of the rod relative to the support as well as provide a cushion between the rod and the support obviating rattle.

4 Claims, 3 Drawing Sheets

ROD GUIDE CLIP

BACKGROUND OF THE INVENTION

This invention relates generally to rod guide members and more particularly to a rod guide member which is capable of guiding linear and shiftable movement of a rod relative to a support as well as preventing rattle between the rod and the support.

Rod guide members are used in vehicles and in other products to guide movement of a rod relative to a support. When used in conjunction with vehicle door locking systems, the guide member guides movement of the connecting rods between various latch operators, such as a handle or garnish button, and the door latch. It is known in the prior art to provide various types of guide members and it is also known in the prior art to prevent rattle between the rod and the support, such as the inner panel of the door, by the use of sleeves of material on the rod.

The rod guide member of this invention performs both functions. It both guides linear and shifting movement of the rod relative to the support and also prevents contact between the rod and the support to prevent rattle.

The primary feature of this invention is that it provides a rod guide member for guiding linear and shifting movement of a rod relative to a support as well as preventing contact between the rod and the support to obviate rattle therebetween. Another feature is that the guide member includes a strap portion which is return bent upon itself and is located between the rod and the support, with one end of the strap portion being secured to the support and the other end of the strap portion being secured to the rod, and with the legs of the return bent strap portion being extendible and retractable relative to each other to accommodate linear movement of the rod relative to the support and being movable laterally relative to each other to accommodate shifting movement of the rod relative to the support. A further feature is that the legs and the bight of the return bent strap portion act as a cushion between the rod and the support to obviate rattle. Yet another feature is that, in another embodiment, the rod guide member includes a pair of strap portions to accommodate independent movement of a pair of rods relative to each other and to the support as well as obviate rattle between the rod members and also between the rod members and the support.

These and other features will be readily apparent from the following specification and drawings wherein.

Figure 1:
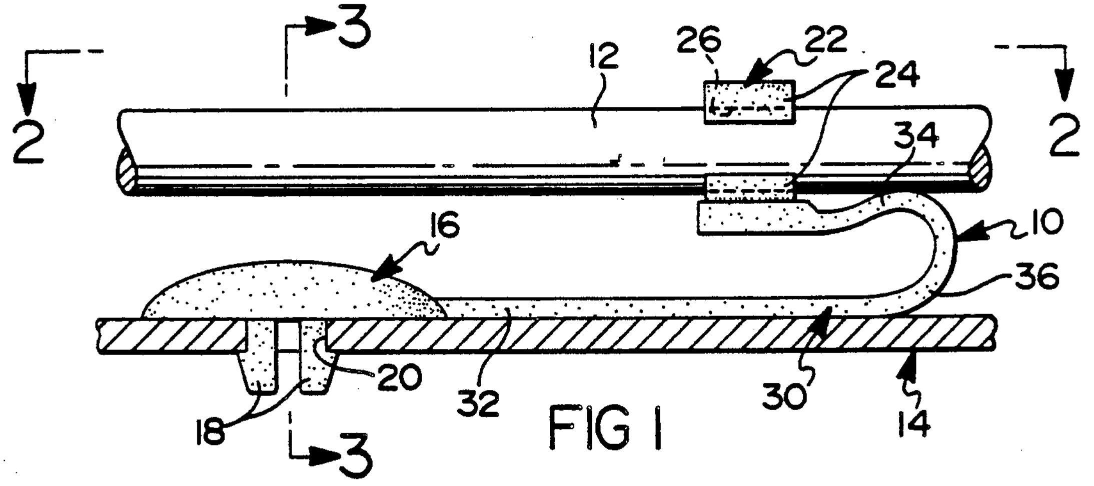
FIG. 1 is a side elevational view of a rod guide member, according to one embodiment of this invention, positioned between a rod and a support.
Figure 2:
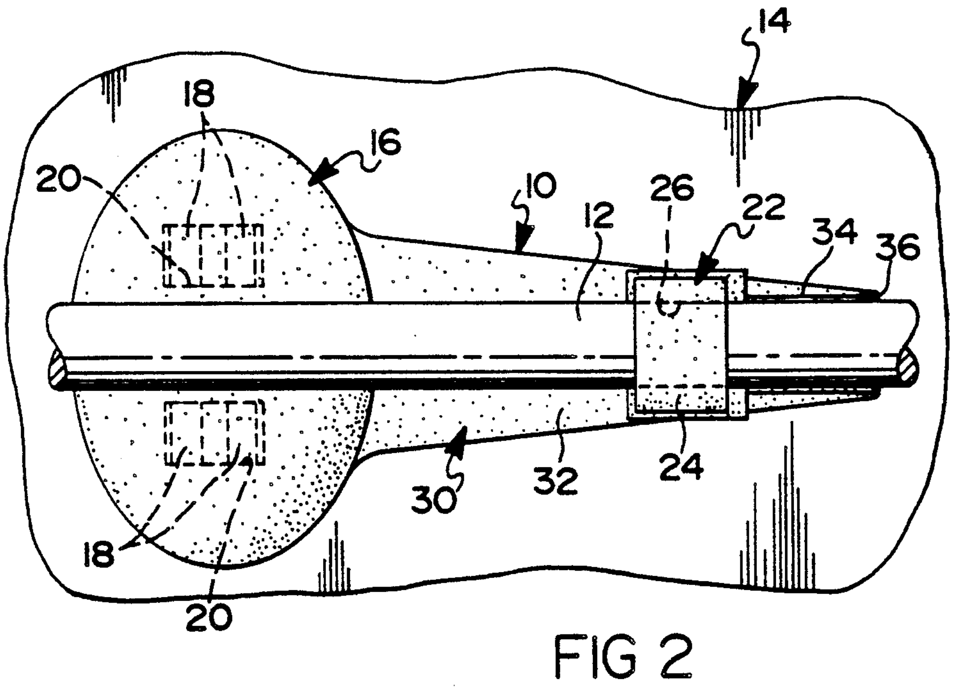
FIG. 2 is a plan view taken along line 2—2 of FIG. 1.
Figure 3:
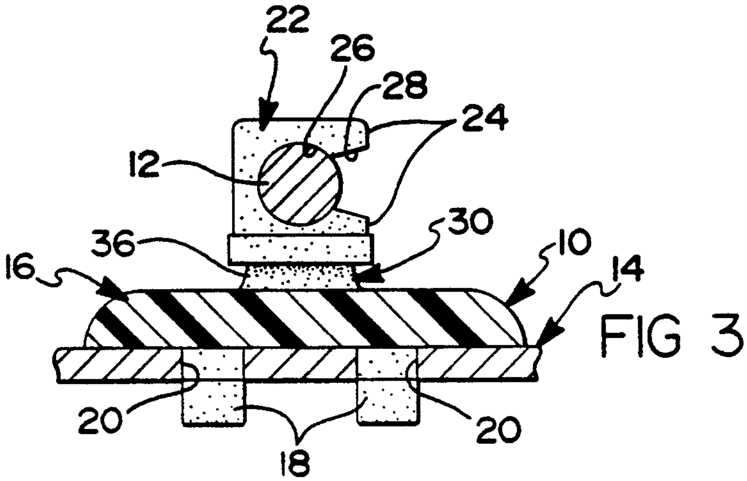
FIG. 3 is a sectional view taken along 3—3 of FIG. 1.

Referring now to FIGS. 1, 2 and 3 of the drawing, a rod guide member designated generally 10, according to this invention, guides movement of a rod 12 relative to a support 14. In the specific arrangement shown, the rod 12 connects an operating member, such as a handle or garnish button, and a vehicle door latch, neither shown, so that operation of the operating member releases the latch or places the latch in either latched or unlatched condition. The support 14 is shown as the inner panel of a vehicle door.

The rod guide member 10 is formed of flexible plastic material and includes a body portion 16 which is in the shape of an oval button having spaced pairs of hook shaped legs 18 extending from the lower side thereof. As apparent from FIGS. 2 and 3, each pair of legs 18 extends into an opening 20 of the support 14 to secure the rod guide member 10 thereto. The rod guide member 10 also includes an integral rod attachment portion 22 having a pair of integral flexible legs 24 providing a circular throat 26 which receives rod 12 and opens outwardly of the legs 24 through a tapered opening 28. The tapered opening 28 permits the attachment portion 22 to be forced over the rod 12 at whatever position desired in order to removably and releasably secure the rod 12 to the guide member 10.

The guide member includes a tapered planar strap portion 30 integrally interconnecting the body portion 16 and the attachment portion 22, with this strap portion assuming a return bent configuration when the guide member is secured to the support and to the rod 12. Both the legs 32 and 34 and the bight 36 of the return bent strap portion are located between the rod 12 and the support 14 and act as a cushion therebetween to prevent rattle of the rod 12 relative to the support.

Figure 4:
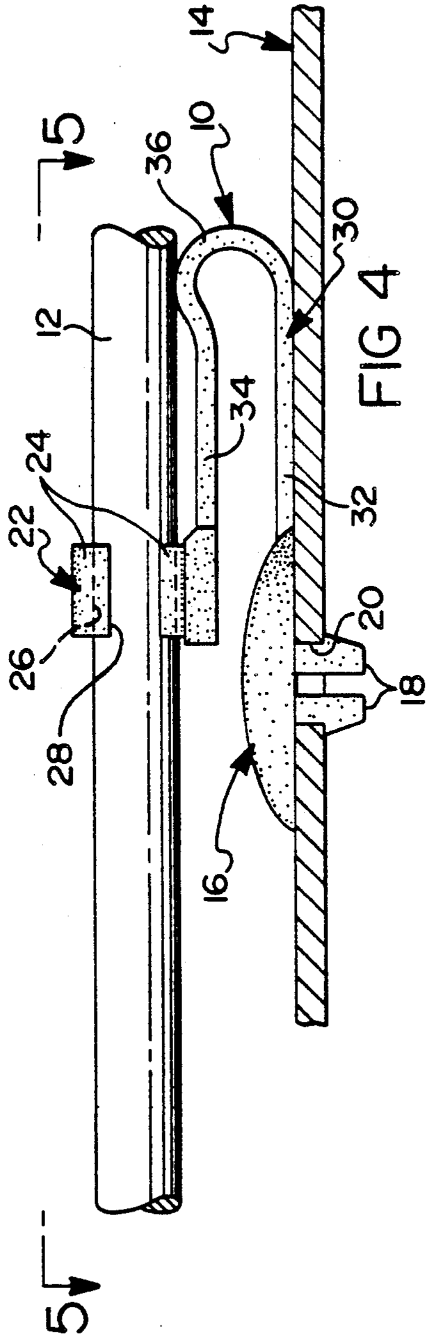
FIG. 4 is a view showing the rod guide member accommodating lateral movement of the rod relative to the support.
Figure 5:
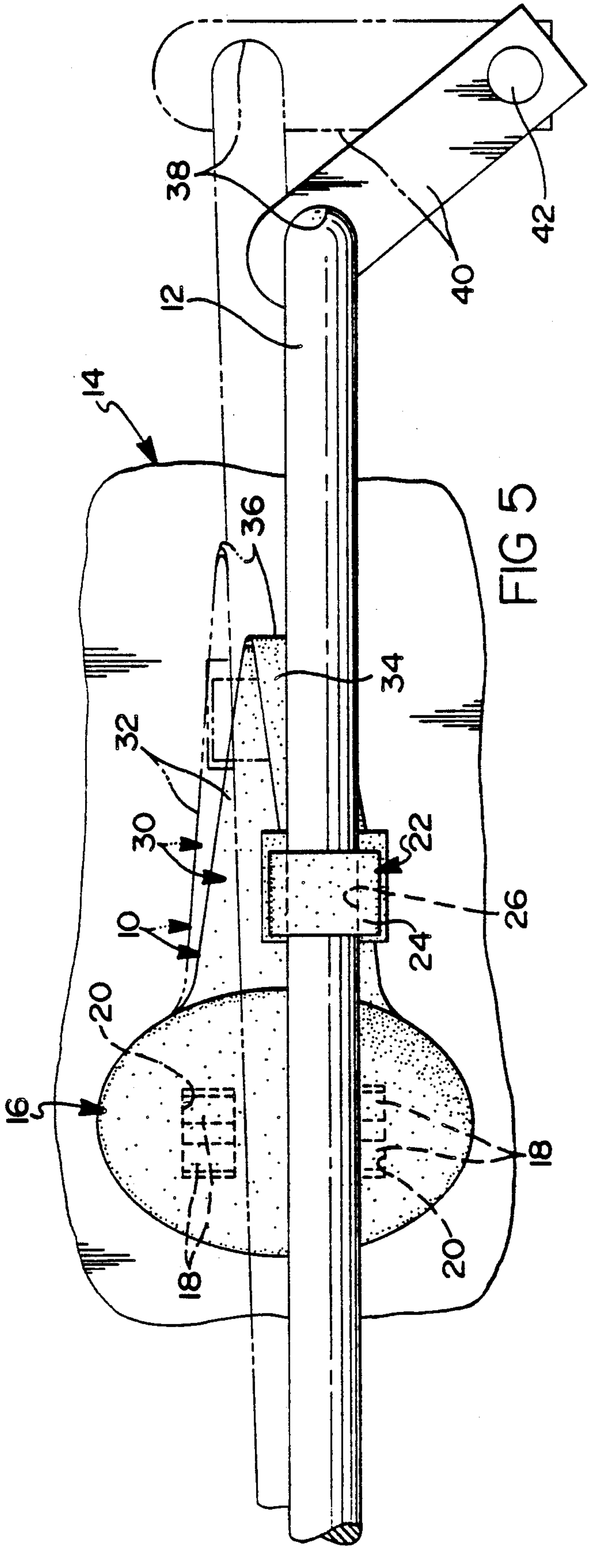
FIG. 5 is a view taken along line 5—5 of FIG. 4.

Referring now to FIGS. 4 and 5, it can be seen that the legs 32 and 34 of the strap portion 30 extend and retract relative to each other as the rod 12 moves linearly generally relative to the support 14. In all positions of the rod 12, the return bent strap portion 30 prevents contact between the rod and the support. As shown in FIG. 5, should the rod 12 shift laterally as well as move linearly, such as by the rod having one end thereof pivotally secured at 38 to an operating lever 40 pivoted at 42 to the support 14, the legs 32 and 34 of the strap portion accommodate this combined linear and shifting movement by shifting laterally relative to each other as indicated by a comparison of the dash line and full line positions thereof shown in FIG. 5. The attachment portion 22 extends from the same side of the guide member as the pairs of attachment legs 18. This is necessary for the strap portion 30 to assume a return bent configuration. Also the tapered shape of the strap portion aids the lateral shifting movement of legs 32 and 34 relative to each other.

Figure 6:
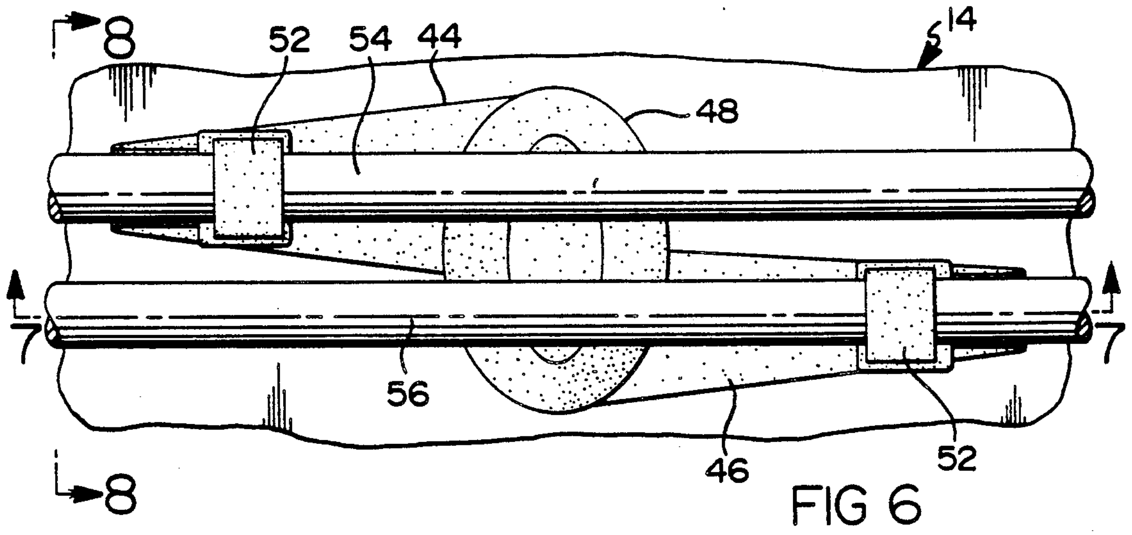
FIG. 6 is a plan view of another embodiment of the rod guide member.
Figure 7:
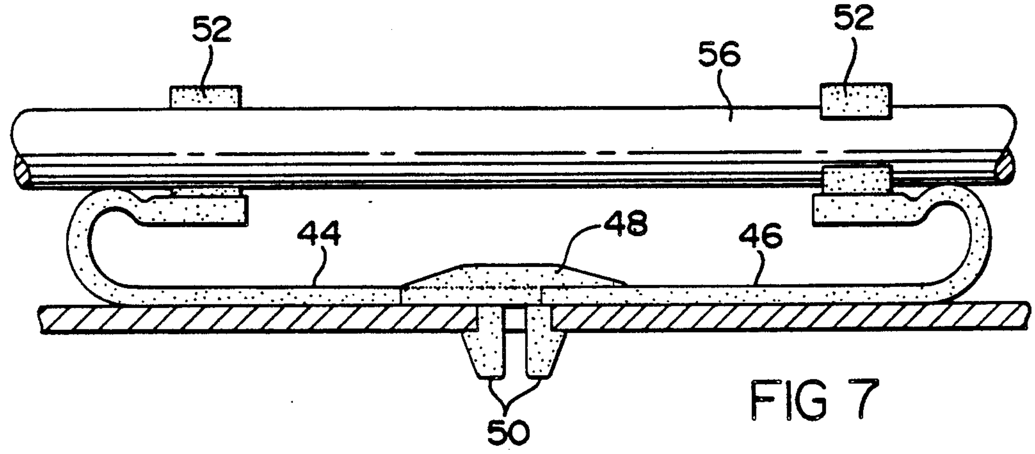
FIG. 7 is view taken along line 7—7 of FIG. 6.
Figure 8:
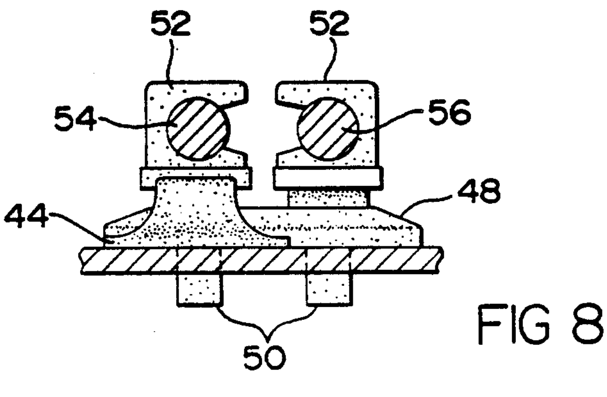
FIG. 8 is a view taken along 8—8 of FIG. 6.

FIGS. 6 through 8 show an alternate embodiment wherein a pair of strap portions 44 and 46 extend oppositely of each other from an oval shaped body portion 48 which is secured to the support 14 in the same manner as the body portion 16 through the use of pairs of hook shaped legs 50 received in openings of the support. Each strap portion 44 and 46 is planar and tapered from the body portion 48 to a respective attachment portion 52, which is the same as attachment portion 22. Each strap portion is return bent upon itself between a respective rod 54 and 56 in the same manner as the strap portion 30. The attachment portions 52 open to each other. Each of the strap portions 44 and 46 independently functions in the same manner as the strap portion 30 to accommodate both linear and shiftable movement of a respective rod member 54 and 56 relative to the support and to each other. Further, the attachment portions 52 act as cushions or anti-rattle members preventing engagement of the rod members 54 and 56 with each other.

Thus, this invention provides a rod guide member capable of guiding linear and shifting movement of a rod relative to a support as well as preventing rattle therebetween.

The embodiments of the invention in which an exclusive property or privilege is claimed are defined as follows:

1. In combination with a support and a rod member spaced from the support and movable relative thereto, a rod guide member capable of guiding linear and shiftable movement of the rod member relative to the support and preventing rattle therebetween, comprising, a strap portion of flexible material, support attachment means at one end portion of the strap portion cooperable with the support to removably secure the one end portion of the guide member thereto, and rod member attachment means at the other end portion of the strap portion cooperable with the rod member to removably secure the other end portion of the strap portion thereto, the strap portion being return bent upon itself between the end portions thereof, the legs and the bight of the return bent strap portion being located between the support and the rod member to provide an anti-rattle cushion therebetween, the legs of the return bent strap portion extending and retracting relative to each other as the rod member moves linearly, and, such legs shifting laterally relative to each other as the rod member shifts laterally relative to the support.

2. In combination with a support and a rod member spaced from the support and movable relative thereto, a rod guide member capable of guiding linear and shiftable movement of the rod member relative to the support and preventing rattle therebetween, comprising, a strap portion of flexible material, support attachment means extending from one side of the strap portion at one end portion thereof and cooperable with the support to removably secure the one end portion of the guide member thereto, and rod member attachment means extending from the one side of the strap portion at the other end portion thereof and cooperable with the rod member to removably secure the other end portion of the strap portion thereto, the strap portion being return bent upon itself between the end portions thereof, the legs and the bight of the return bent strap portion being located between the support and the rod member to provide an anti-rattle cushion therebetween, the legs of the return bent strap portion extending and retracting relative to each other as the rod member moves linearly, and, such legs shifting laterally relative to each other as the rod member shifts laterally relative to the support.

3. In combination with a support and a pair of rod members spaced from the support and movable relative thereto and independently of each other, a rod guide member capable of guiding independent linear and shiftable movement of each rod member relative to the support and preventing rattle therebetween, comprising, a body portion, means on the body portion cooperable with the support to removably secure the guide member thereto, a pair of strap portions of flexible material, each strap portion having one end portion thereof secured to the body portion, rod member attachment means on the other end portion of each strap portion cooperable with a respective rod member to removably secure the other end portion of the strap portion thereto, each strap portion being return bent upon itself between the end portions thereof, the legs and the bight of each return bent strap portion being located between the support and a respective rod member to provide an anti-rattle cushion therebetween, the legs of each return bent portion extending and retracting relative to each other as the respective rod member moves linearly relative to the support, and, such legs shifting laterally relative to each other as the respective rod member shifts laterally relative to the support.

4. In combination with a support and a rod member spaced from the support and movable relative thereto, a rod guide member capable of guiding linear and shiftable movement of the rod member relative to the support and preventing rattle therebetween, comprising, a generally planar strap portion of flexible material, integral support attachment means extending from one side of the strap portion at one end portion thereof and cooperable with the support to removably secure the one end portion of the guide member thereto, and integral rod member clamping means extending from the one side of the strap portion at the other end portion thereof and cooperable with the rod member to removably secure the other end portion of the strap portion thereto, the strap portion being return bent upon itself between end portions thereof, the length of the legs of the return bent strap portion and the position of the bight being set by the clamping means and respective rod member, the legs and the bight of the return bent strap portion being located between the support and the rod member to provide an anti-rattle cushion therebetween, the legs of the return bent strap portion extending and retracting relative to each other as the rod member moves linearly, and shifting laterally relative to each other as the rod member shifts laterally relative to the support.

* * * * *